(12) United States Patent
McMahon et al.

(10) Patent No.: US 11,580,438 B1
(45) Date of Patent: Feb. 14, 2023

(54) DRIVER HAMILTONIANS FOR USE WITH THE QUANTUM APPROXIMATE OPTIMIZATION ALGORITHM IN SOLVING COMBINATORIAL OPTIMIZATION PROBLEMS WITH CIRCUIT-MODEL QUANTUM COMPUTING FACILITIES

(71) Applicant: QC Ware Corp., Palo Alto, CA (US)

(72) Inventors: Peter L. McMahon, Menlo Park, CA (US); Asier Ozaeta Rodriguez, Palo Alto, CA (US)

(73) Assignee: QC Ware Corp., Palo Alto, CA (US)

( * ) Notice: Subject to any disclaimer, the term of this patent is extended or adjusted under 35 U.S.C. 154(b) by 1017 days.

(21) Appl. No.: 16/292,111

(22) Filed: Mar. 4, 2019

Related U.S. Application Data

(60) Provisional application No. 62/640,016, filed on Mar. 8, 2018.

(51) Int. Cl.
| | |
|---|---|
| G06N 10/60 | (2022.01) |
| G06F 15/16 | (2006.01) |
| G06N 10/00 | (2022.01) |
| G06N 20/00 | (2019.01) |
| B82Y 10/00 | (2011.01) |
| G06N 5/00 | (2006.01) |

(52) U.S. Cl.
CPC .............. *G06N 10/60* (2022.01); *G06F 15/16* (2013.01); *B82Y 10/00* (2013.01); *G06N 5/003* (2013.01); *G06N 10/00* (2019.01); *G06N 20/00* (2019.01)

(58) Field of Classification Search
CPC ........ G06F 15/16; G06N 10/00; G06N 5/003; G06N 20/00; G06N 10/60; B82Y 10/00
See application file for complete search history.

(56) References Cited

U.S. PATENT DOCUMENTS

| | | | | |
|---|---|---|---|---|
| 2014/0187427 | A1* | 7/2014 | Macready | ................ G06N 5/02 706/46 |
| 2017/0364362 | A1* | 12/2017 | Lidar | .................... G06F 9/3861 |
| 2018/0260731 | A1* | 9/2018 | Zeng | ...................... G06N 10/00 |

* cited by examiner

*Primary Examiner* — Terrell S Johnson
(74) *Attorney, Agent, or Firm* — Fenwick & West LLP

(57) ABSTRACT

The driver Hamiltonian is modified in such a way that the quantum approximate optimization algorithm (QAOA) running on a circuit-model quantum computing facility (e.g., actual quantum computing device or simulator), may better solve combinatorial optimization problems than with the baseline/default choice of driver Hamiltonian. For example, the driver Hamiltonian may be chosen so that the overall Hamiltonian is non-stoquastic.

20 Claims, 2 Drawing Sheets

DRIVER HAMILTONIANS FOR USE WITH THE QUANTUM APPROXIMATE OPTIMIZATION ALGORITHM IN SOLVING COMBINATORIAL OPTIMIZATION PROBLEMS WITH CIRCUIT-MODEL QUANTUM COMPUTING FACILITIES

CROSS-REFERENCE TO RELATED APPLICATION(S)

This application claims priority under 35 U.S.C. § 119(e) to U.S. Provisional Patent Application Ser. No. 62/640,016, "A method for improving the accuracy and time-to-solution of the quantum approximate optimization algorithm in solving combinatorial optimization problems with circuit model quantum computers by using a novel driver Hamiltonian," filed Mar. 8, 2018. The subject matter of all of the foregoing is incorporated herein by reference in its entirety.

BACKGROUND

1. Technical Field

The disclosure is in the technical field of circuit-model quantum computation. More particularly, it relates to tuning the internal working mechanisms of the quantum approximate optimization algorithm (QAOA) to improve its performance running on a circuit-model (CM) quantum computer (QC) or simulator.

2. Description of Related Art

QAOA is a computational paradigm for producing approximate solutions to difficult combinatorial optimization problems. One of the main choices that is available in the QAOA algorithm is the driver Hamiltonian, which defines the operators that are applied to the quantum state in the quantum computer in addition to those from the cost-function (aka problem) Hamiltonian. The problem function Hamiltonian encodes the combinatorial optimization problem to be solved, whereas the driver Hamiltonian plays an analogous role to that of the driver Hamiltonian in adiabatic quantum computation (AQC), where the driver can be interpreted as adding quantum fluctuations that allow the computer to faster explore the search space. The choice of the driver Hamiltonian can have a dramatic impact on the performance of the QAOA.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Figure 1:
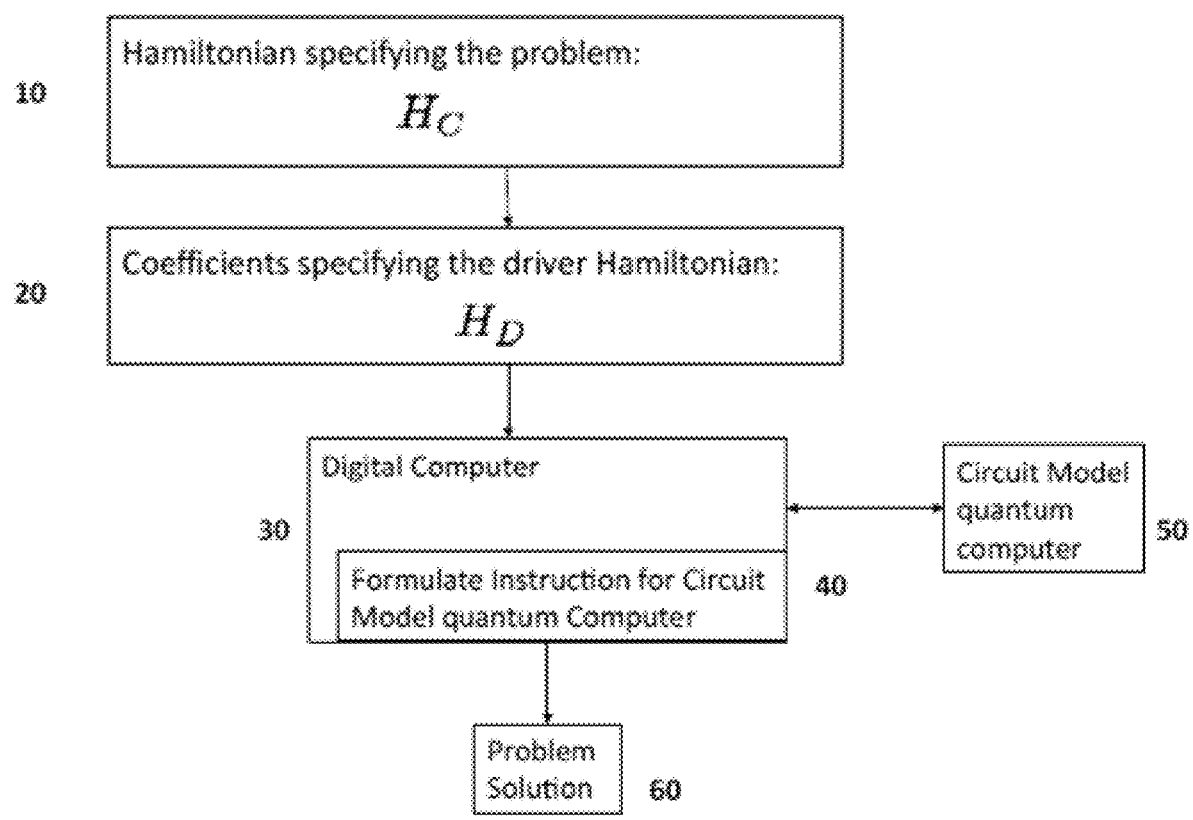
FIG. 1 is a diagram showing the workflow involved in solving an optimization problem using QAOA on a quantum computing device, according to one embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In one aspect, the driver Hamiltonian is modified in such a way that the QAOA running on a circuit-model quantum computing facility (e.g., actual quantum computing device or simulator), may better solve combinatorial optimization problems than with the baseline/default choice of driver Hamiltonian. Examples of problem classes that are suitable for this type of computation include Boolean satisfiability, constrained binary optimization, scheduling, path planning, and graph problems. There are potential use cases in design and verification, cryptography, combinatorial auctions, portfolio optimization, community detection, aircrew and aircraft rostering, inventory management, order fulfillment, autonomous vehicle routing, and tactical planning, for example.

First clarify some of the technical terms used in this document to avoid confusion. QAOA is a known quantum algorithm (introduced by Farhi, Goldstone, and Gutmann) for approximate combinatorial optimization that uses a predefined number of steps. The number of steps is an input of the algorithm—the higher the number of steps, the higher the precision of the algorithm. However, the algorithm does not technically run for the number of steps. The number of steps relates more to the accuracy and the number of angles. The input is an n bit instance with an objective function that is the sum of several terms. The goal is to find a string that is close to the global minimum (or maximum) of this function. In conventional QAOA, this is done by applying a set of two operators for each step, and optimizing a set of angles for the operators. The measurement in the computational basis yields the desired solution.

AQC (introduced by Farhi, Goldstone, Gutmann, and Sipser) is a form of quantum computation that proceeds from an initial Hamiltonian whose ground state is easy to prepare, to a final Hamiltonian whose ground state encodes the solution to the computational problem. The adiabatic theorem guarantees that the system will track the instantaneous grounds state provided the Hamiltonian varies sufficiently slowly.

Circuit-model QC refers to a type of quantum computation that uses a sequence of quantum gates that are reversible transformations of a quantum register of n qubits. This type of QC is programmable and the performed computation can be modified based on the properties and position of the gates.

The user of the QAOA wants to find a minimum of the combinatorial optimization problem encoded in a problem or cost Hamiltonian, Initially the QAOA prepares an equal superposition of all bit strings, then for several steps a pair of unitary operations are applied before measuring the resulting state. Each step n evolves the system with a cost unitary $$\hat{U} = \exp(-iH_C(\gamma_n)) \tag{1}$$

for some angle $\gamma_n$ and a driver unitary $$\hat{V} = \exp(-iH_D(\beta_n)) \tag{2}$$

where $\beta_n$ is some angle and $H_D$ is the driver Hamiltonian. Here, i is sqrt(−1). The QAOA algorithm has several different variations. This disclosure is not limited to the exact description above.

Referring now to FIG. 1, one component 10 of the QAOA algorithm is the array of coefficients specifying the minimization problem to be solved in the form of a cost Hamiltonian. This is typically provided by the user, typically in electronic form, via some interface to the circuit-model quantum computing facility.

Next is the array of coefficients specifying the driver Hamiltonian 20 to be used by the QAOA. This is either set to the default value or is provided by the user, typically in electronic form, via some interface to the circuit-model quantum computing facility.

The choice of coefficients 20 can have a dramatic impact on the performance of the computer. The standard driver Hamiltonian $H_D$ takes the form $$H_D = \Sigma_k \sigma_k^{(x)} \tag{3}$$

where k is an index to the qubits used in the QAOA. We define $\sigma^{(l)}$ as the Pauli matrices, which are described as follows:

$$\sigma^{(x)} = \begin{pmatrix} 0 & 1 \\ 1 & 0 \end{pmatrix} \tag{4a}$$

$$\sigma^{(y)} = \begin{pmatrix} 0 & -i \\ i & 0 \end{pmatrix} \tag{4b}$$

$$\sigma^{(z)} = \begin{pmatrix} 1 & 0 \\ 0 & -1 \end{pmatrix} \tag{4c}$$

The Hamiltonian describing the dynamics of the entire computation is stoquastic if the driver Hamiltonian takes the form of Eqn. 3. However, there are forms of the driver Hamiltonian that result in the overall Hamiltonian being non-stoquastic. Non-stoquastic Hamiltonians correspond to a subclass that does not have an efficient classical proving protocol, e.g., quantum Monte Carlo simulation. This subclass involves all local spin Hamiltonians whose matrix elements in the standard basis of the qubits do not satisfy the condition that all off-diagonal matrix elements are real and non-positive. A property of such Hamiltonians is that the Gibbs density matrix has negative matrix elements in the standard basis, which does not allow for efficient sampling from this distribution.

Conventionally, QAOA in its default form is already not efficiently classically simulable. This suggests that modifying the standard driver Hamiltonian for QAOA will make the classical simulation of the algorithm even more difficult.

However, contrary to this, one can modify the driver Hamiltonian in a manner that aids the performance of the overall QAOA algorithm in finding good or exact solutions to the combinatorial optimization problem it is trying to solve. The following are some examples.

One such way is to replace the standard driver Hamiltonian with the driver Hamiltonian $$H_{\tilde{D}} = H_D + H_{non\_st} \tag{5}$$

Examples of $H_{non\_st}$ include $$H_{non\_st} = \pm \Sigma_{ij} \sigma_i^{(x)} \sigma_j^{(x)} \tag{6a}$$

$$H_{non\_st} = \pm \Sigma_{ij} \sigma_i^{(x)} \sigma_j^{(y)} \tag{6b}$$

$$H_{non\_st} = \pm \Sigma_{ij} \sigma_i^{(x)} \sigma_j^{(z)} \tag{6c}$$

These are three different possible definitions of terms that would make the driver Hamiltonian non-stoquastic. Furthermore, it is also possible to assign an extra angle to the new term $H_{non\_st}$ in the driver Hamiltonian, leading to a new driver unitary of the form $$\hat{V}_{non\_st} = \exp(-i[H_D(\beta_i) + H_{non\_st}(\alpha_{ij})]) \tag{7}$$

where $\alpha_{ij}$ are the angles corresponding to the $H_{non\_st}(\ )$ terms. The non-stoquastic terms in the Hamiltonian do not necessarily need to be introduced in the QAOA circuit at the positions described above but can be applied at any point of the algorithm.

For example, define the additional driver unitary $$\hat{W} = \exp(-iH_{non\_st}(\alpha_{ij})) \tag{8}$$

In the QAOA, after initially preparing an equal superposition of all bit strings, sequences of unitary operations are applied for several steps before measuring the resulting state. Below we list a few examples of these sequences, $\hat{S}$, $$\hat{S} = \hat{U}\hat{V}\hat{W} \tag{9a}$$

$$\hat{S} = \hat{U}\hat{W}\hat{V} \tag{9b}$$

$$\hat{S} = \hat{W}\hat{U}\hat{V} \tag{9c}$$

$$\hat{S} = \hat{W}\hat{V}\hat{U} \tag{9d}$$

$$\hat{S} = \hat{V}\hat{W}\hat{U} \tag{9e}$$

$$\hat{S} = \hat{V}\hat{U}\hat{W} \tag{9f}$$

In these examples, $\hat{U}$ is the unitary operator based on the problem Hamiltonian (Eqn. 1), and $\hat{V}$ is the unitary operator for the standard driver Hamiltonian (Eqn. 2). The non-standard part of the driver Hamiltonian is introduced by operator $\hat{W}$.

An alternative way of defining these sequences is by dividing the unitary operators into those that apply 1-qubit gates, $\hat{A}$, and those that correspond to several rounds, m, of 2-qubit gates $\hat{B}_m$. These rounds allow for one qubit to participate in several 2-qubit gates. Some examples of these sequences are listed below:

$$\hat{S} = \hat{A}\hat{B}_m\hat{W} \tag{10a}$$

$$\hat{S} = \hat{A}\hat{W}\hat{B}_m \tag{10b}$$

$$\hat{S} = \hat{W}\hat{A}\hat{B}_m \tag{10c}$$

$$\hat{S} = \hat{W}\hat{B}_m\hat{A} \tag{10d}$$

$$\hat{S} = \hat{B}_m\hat{W}\hat{A} \tag{10e}$$

$$\hat{S} = \hat{B}_m\hat{A}\hat{W} \tag{10f}$$

The additional driver unitary $\hat{W}$ can also be included in between the rounds of the 2-qubit unitary operators, which corresponds to yet another sequence.

More unitary operators that improve the performance further can be added to the sequences of unitary operators described above. Note that these examples can differ from the previously described ones due to the exponentiation of matrices.

Now the task is to find the values of the binary variables $x_1, \ldots, x_N$ that minimize the value of the cost Hamiltonian. In the example of FIG. 1, this is accomplished by using a traditional digital computer 30 to create the instruction 40 that is executed by the circuit-model quantum computer 50.

The digital computer 30 converts the arrays of coefficients 10 and 20 into an instruction 40 for the circuit-model quantum computer 50. Once the instruction has been formulated, the instruction formulation module 40 running on the digital computer 30, sends the instruction via a network connection to the circuit-model quantum computer 50. The circuit-model quantum computer 50 solves for the bit string, $x_1, \ldots, x_N$, that most likely represents the best selection of the $x_1, \ldots, x_N$ for the user. The solution is returned to the digital computer 30 and the final solution to the minimization problem is output 60 to the user.

The information from the digital computer 30 is sent to the circuit-model quantum computer 50 using standard network protocols. The circuit-model quantum computer could be located in the same physical facility as the digital computer, or it could be at a remote location connected by the Internet.

Figure 2:
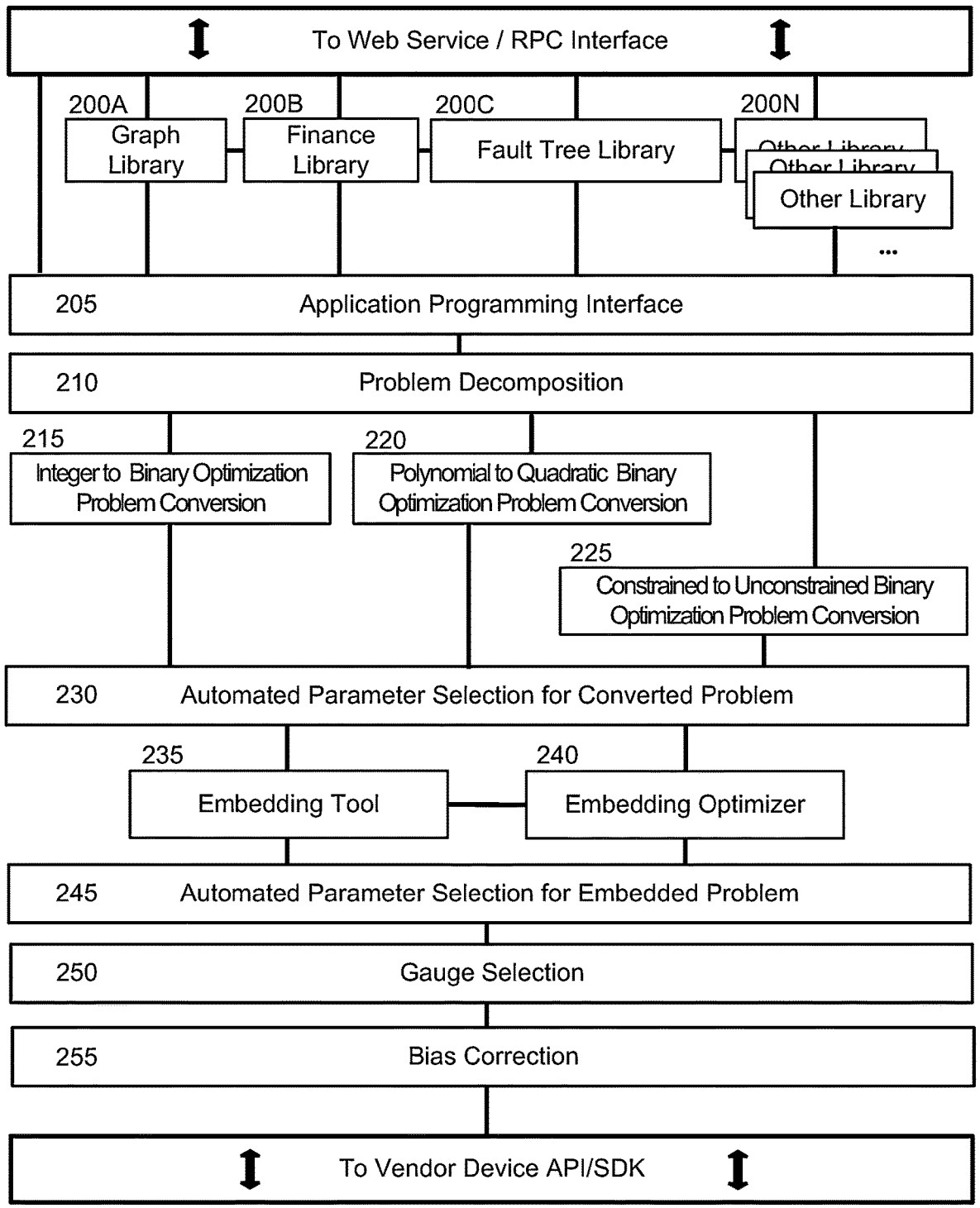
FIG. 2 is a logical diagram of a backend server suitable for use in providing quantum computing as a service.

For example, the approaches described above can be implemented using quantum computing as a service platform, as further described in FIG. 2. FIG. 2 is a logical diagram of a backend server suitable for use in providing quantum computing as a service. The methods described above for implementing QAOA may be used with such a system. Data flows into and out of the server via the interfaces at the top and bottom of the diagram. The web service/RPC interface at the top of FIG. 2 is user-facing. The vendor device API/SDK at the bottom connects to the hardware quantum computing device(s).

The backend server may contain one or more domain-specific libraries 200 that may be useful for developing software for or solving problems on quantum processing devices. Each domain-specific library may include software routines, data models, and other such resources as may typically appear in a software library. FIG. 2 specifically shows graph analytics 200A, finance 200B, and a fault tree 200C as domains where domain-specific libraries and routines may be especially useful, but library 200N emphasizes that any domain-specific library may be incorporated at this layer of the backend server. The numbering 200A-N emphasizes the extensible nature of the backend server. Based upon the components lower down in the diagram, any number of domain-specific libraries 200 may be written and integrated into the backend server. The functions 222, 224, 226 shown in FIG. 2 may be implemented as part of the fault tree library 200C.

The API 205 exposes the functions, data structures, models, and other core interfaces of the backend server. The API 205 may connect with one or more libraries 200A-N and/or may directly communicate with the web service/RPC interface, depending on the information being supplied to the backend server. The API 205 is responsible for examining a problem and whatever information is supplied to the backend server and determining how to execute the problem on quantum processing devices and/or classical solver libraries, with the help of the remaining modules shown in FIG. 2.

One such module is problem decomposition module 210. The processes conducted by this module involve taking a large problem and splitting it into smaller subproblems, whose solutions may be combined to obtain an exact or approximate solution to the entire problem. For example, if one is solving the Traveling Salesman Problem (TSP) for a large number of cities, there are heuristics in the literature for how to decompose the problem into multiple smaller TSP subproblems over smaller numbers of cities, and to then recombine the solutions of those subproblems into an approximate solution for the overall TSP problem.

The modules, 215, 220, and 225, relate to taking a discrete optimization problem of one form and converting it into a quadratic binary unconstrained form. Module 215 uses heuristics to convert an integer optimization problem into a binary optimization problem. Module 220 uses heuristics to convert a higher-order polynomial binary optimization problem into a quadratic binary optimization problem. Module 225 uses heuristics involving penalty terms to convert a constrained binary optimization problem into an unconstrained binary optimization problem. Depending on the input provided to the backend server, none, one, some, or all of these modules 215, 220, 225 may be used to prepare the problem for solution on the quantum processing devices and/or other solver libraries underlying the platform.

Module 230 provides optimizations for the processed problem to improve the quality of the solution obtained via the platform.

When the problem is in an optimized state, embedding tools 235, 240 may be run to fit the problem onto a model of the particular hardware architecture of a target quantum processing device. For instance, if a problem is to be solved using a D-Wave quantum processing device, these tools will map the problem onto the chimera graph architecture of that device. The embedding tool 235 may be vendor-supplied or a third-party library, whereas tool 240 can take the output of another embedding tool 235 and provide additional optimizations to make the embedding as compact as possible.

Tool 240 may operate by running the embedding tool 235 multiple times, and choosing the best result to use as the embedding (such may be the mode of operation when tool 235 produces different outputs for different executions). The "best" output of tool 235 may be the embedding with the fewest number of qubits used, the embedding with the shortest chain lengths, or some other criteria that may be specified. Other techniques may be incorporated into the platform for selecting and optimizing embeddings.

The embedded problem (output of tools 235 and/or 240) is then optimized for execution on a specific device via modules 245, 250, 255. At the very end of the process, the optimized problem is dispatched to one or more vendor device APIs/SDKs. At a later point in time, solutions are returned and are passed back to the end user.

Note that the collection of modules in the server-side platform library may be executed iteratively or in the style of a "feedback loop," where one or more of the modules are executed repeatedly, either in parallel or in serial. Generally, many of the modules, e.g. 230, 235, 240, 245, 250, 255, etc., may benefit from multiple executions, and as such, the platform may include options and modes for executing some or all of the modules repeatedly in the style of a feedback loop to obtain more suitable results. The platform does not restrict which modules may be run in this iterative fashion.

Although the detailed description contains many specifics, these should not be construed as limiting the scope of the invention but merely as illustrating different examples. It should be appreciated that the scope of the disclosure includes other embodiments not discussed in detail above, for example, expressions of the driver Hamiltonian with other Pauli matrices and parameters. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method implemented on a digital computer system comprising a processor, the processor executing instructions to execute a method for solving a combinatorial optimization problem using a quantum approximate optimization algorithm (QAOA), the method comprising:
   calculating a problem Hamiltonian that encodes the combinatorial optimization problem;
   selecting a driver Hamiltonian that makes an overall Hamiltonian for the QAOA non-stoquastic; and configuring and causing a circuit-model quantum computing facility to run the QAOA using the problem Hamiltonian and the driver Hamiltonian.

2. The computer-implemented method of claim 1 wherein the driver Hamiltonian is given by $H_D' = H_D + H_{non\_st}$; and
$H_D = \Sigma_k \sigma_k^{(x)}$, where k is an index of each qubit used in the QAOA;
$H_{non\_st} = \pm \Sigma_{ij} \sigma_i^{(x)} \sigma_j^{(l)}$, where (l)=(x), (y) or (z), and i, j are indices of each qubit used in the QAOA; and
$\sigma^{(l)}$ are Pauli matrices for (l)=(x), (y) or (z).

3. The computer-implemented method of claim 2 wherein the QAOA uses a driver unitary of a form $\hat{V}_{non\_st} = \exp(-i[H_D(\beta_i) + H_{non\_st}(\alpha_{ij})])$, where $\alpha_{ij}$ are angles for the $H_{non\_st}(\,)$ terms.

4. The computer-implemented method of claim 1 wherein the QAOA uses a driver unitary of a form $\hat{W} = \exp(-iH_{non\_st}(\alpha_{ij}))$; and
$H_{non\_st} = \pm \Sigma_{ij} \sigma_i^{(x)} \sigma_j^{(l)}$, where (l)=(x), (y) or (z), i, j are indices of each qubit used in the QAOA, and $\alpha_{ij}$ are angles for the $H_{non\_st}(\,)$ terms; and
$\sigma^{(l)}$ are Pauli matrices for (l)=(x), (y) or (z).

5. The computer-implemented method of claim 4 wherein the QAOA applies sequences of unitary operators $\hat{U}$, $\hat{V}$, and $\hat{W}$, where $\hat{U}$ is a unitary operator based on the problem Hamiltonian, and $\hat{V}$ is a unitary operator based on $H_D = \Sigma_k \sigma_k^{(x)}$ where k is an index of each qubit used in the QAOA.

6. The computer-implemented method of claim 4 wherein the QAOA applies sequences of unitary operators $\hat{A}$, $\hat{B}_m$, and $\hat{W}$, where $\hat{A}$ is a unitary operator that applies 1-qubit gates, and $\hat{B}_m$ is a unitary operator that applies m rounds of 2-qubit gates.

7. The computer-implemented method of claim 4 wherein the QAOA applies $\hat{W}$ between rounds of 2-qubit unitary operators.

8. The computer-implemented method of claim 1 wherein a solution found using the driver Hamiltonian is a more optimal solution of the combinatorial optimization problem than a solution found using only a conventional driver Hamiltonian $H_D = \Sigma_k \sigma_k^{(x)}$, where k is an index of each qubit used in the QAOA and $\sigma^{(x)}$ is a Pauli matrix.

9. The computer-implemented method of claim 1 wherein the QAOA using the driver Hamiltonian requires less run time to find an equally optimal solution of the combinatorial optimization problem than a QAOA using only a conventional driver Hamiltonian $H_D = \Sigma_k \sigma_k^{(x)}$, where k is an index of each qubit used in the QAOA and $\sigma^{(x)}$ is a Pauli matrix.

10. The computer-implemented method of claim 1 wherein the circuit-model quantum computing facility is a circuit-model quantum computing device.

11. The computer-implemented method of claim 1 wherein the circuit-model quantum computing facility is a simulator of a circuit-model quantum computing device.

12. The computer-implemented method of claim 1 wherein the combinatorial optimization problem is one of a Boolean satisfiability, a constrained binary optimization, a scheduling, a path planning, or a graph problem.

13. The computer-implemented method of claim 1 wherein the combinatorial optimization problem is a problem in design and verification, cryptography, combinatorial auctions, portfolio optimization, community detection, aircrew and aircraft rostering, inventory management, order fulfillment, autonomous vehicle routing, or tactical planning.

14. A computing system for solving a combinatorial optimization problem, comprising:
a digital computer system; and
a circuit-model quantum computing device;
wherein the digital computer system:
calculates a problem Hamiltonian that encodes the combinatorial optimization problem;
calculates a driver Hamiltonian that makes an overall Hamiltonian for the QAOA non-stoquastic; and
configures and causes the circuit-model quantum computing device to run the QAOA using the problem Hamiltonian and the driver Hamiltonian.

15. The computing system of claim 14 wherein the digital computer system functions as a master machine and the quantum computing device functions as a worker machine controlled by the master machine.

16. The computing system of claim 14 wherein the quantum computing device is available as a shared service to the digital computer system and to other digital computer systems.

17. A non-transitory computer-readable storage medium storing executable computer program instructions for solving a combinatorial optimization problem using a quantum approximate optimization algorithm (QAOA), the instructions executable by a computer system and causing the computer system to perform a method comprising:
calculating a problem Hamiltonian that encodes the combinatorial optimization problem;
calculating a driver Hamiltonian that makes an overall Hamiltonian for the QAOA non-stoquastic; and
configuring and causing a circuit-model quantum computing facility to run the QAOA using the problem Hamiltonian and the driver Hamiltonian.

18. The non-transitory computer-readable storage medium of claim 17 wherein the QAOA uses a driver unitary of a form $\hat{W} = \exp(-iH_{non\_st}(\alpha_{ij}))$; and
$H_{non\_st} = \pm \Sigma_{ij} \sigma_i^{(x)} \sigma_j^{(l)}$, where (l)=(x), (y) or (z), i, j are indices of each qubit used in the QAOA, and $\alpha_{ij}$ are angles for the $H_{non\_st}(\,)$ terms; and
$\sigma^{(l)}$ are Pauli matrices for (l)=(x), (y) or (z).

19. The non-transitory computer-readable storage medium of claim 18 wherein the QAOA applies sequences of unitary operators $\hat{U}$, $\hat{V}$, and $\hat{W}$, where $\hat{U}$ is a unitary operator based on the problem Hamiltonian, and $\hat{V}$ is a unitary operator based on $H_D = \Sigma_k \sigma_k^{(x)}$ where k is an index of each qubit used in the QAOA.

20. The non-transitory computer-readable storage medium of claim 18 wherein the QAOA applies sequences of unitary operators $\hat{A}$, $\hat{B}_m$, and $\hat{W}$, where $\hat{A}$ is a unitary operator that applies 1-qubit gates, and $\hat{B}_m$ is a unitary operator that applies m rounds of 2-qubit gates.

\* \* \* \* \*